United States Patent
Cochran et al.

(10) Patent No.: US 9,756,479 B2
(45) Date of Patent: *Sep. 5, 2017

(54) METHOD FOR CALIBRATING THE PHYSICAL POSITION AND ORIENTATION OF AN ELECTRONIC DEVICE

(71) Applicant: IMSI DESIGN, LLC, Novato, CA (US)

(72) Inventors: Douglas R. Cochran, Novato, CA (US); Kevan Chapman, Tulsa, OK (US); Robert Mayer, Larkspur, CA (US); Royal Farros, Woodside, CA (US)

(73) Assignee: IMSI DESIGN, LLC, Novato, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/435,446

(22) PCT Filed: Oct. 11, 2013

(86) PCT No.: PCT/US2013/064720
§ 371 (c)(1),
(2) Date: Apr. 13, 2015

(87) PCT Pub. No.: WO2014/059386
PCT Pub. Date: Apr. 17, 2014

(65) Prior Publication Data
US 2015/0289113 A1    Oct. 8, 2015

Related U.S. Application Data

(60) Provisional application No. 61/712,709, filed on Oct. 11, 2012.

(51) Int. Cl.
*H04W 4/04*    (2009.01)
*H04W 4/02*    (2009.01)
(Continued)

(52) U.S. Cl.
CPC ............. *H04W 4/043* (2013.01); *G01S 19/40* (2013.01); *G01S 19/49* (2013.01); *H04W 4/026* (2013.01)

(58) Field of Classification Search
None
See application file for complete search history.

(56) References Cited

U.S. PATENT DOCUMENTS 6,061,627 A * 5/2000 Sato ....................... G01C 22/02
                                                    340/988
8,311,366 B2 * 11/2012 Schiewe .............. H04N 9/3194
                                                    348/383

(Continued)

*Primary Examiner* — Yonel Beaulieu
*Assistant Examiner* — Krishnan Ramesh
(74) *Attorney, Agent, or Firm* — Craig M. Stainbrook; Stainbrook & Stainbrook, LLP

(57) ABSTRACT

A system and method for calibrating the location and orientation of an electronic device, including an electronic data device having a processor, permanent memory, temporary memory, program loading means, a visual display and display subsystem, user input devices, a motion detection subsystem, an orientation detection subsystem, and a geolocation subsystem. The electronic device is programmed with instructions that, when executed, cause the electronic device to visually display a virtual representation of a user-selected physical space on the electronic visual display and to display a position indicator corresponding to an initial location and orientation of the electronic data device in the user-selected physical space, and thereafter to adjust and correct the location according to either user manual inputs or movement of the electronic data device in the physical space.

14 Claims, 6 Drawing Sheets

(51) Int. Cl.
*G01S 19/40* (2010.01)
*G01S 19/49* (2010.01)

(56) References Cited

U.S. PATENT DOCUMENTS

| | | | | |
|---|---|---|---|---|
| 8,395,968 B2* | 3/2013 | Vartanian | ................ | G01S 15/08 367/99 |
| 8,447,787 B2* | 5/2013 | Koch | ..................... | G01C 21/00 707/798 |
| 8,593,277 B2* | 11/2013 | Nath | ..................... | G01S 5/0252 340/539.13 |
| 2002/0193942 A1* | 12/2002 | Odakura | ................. | G01S 19/13 701/431 |
| 2009/0067749 A1* | 3/2009 | Schiewe | .............. | H04N 9/3194 382/294 |
| 2011/0125402 A1* | 5/2011 | Mitsugi | .................. | G01C 21/20 701/532 |
| 2012/0214507 A1* | 8/2012 | Vartanian | ................ | G01S 15/08 455/456.1 |
| 2012/0235865 A1* | 9/2012 | Nath | ..................... | G01S 5/0252 342/451 |
| 2012/0246198 A1* | 9/2012 | Koch | ..................... | G01C 21/00 707/802 |
| 2013/0238236 A1* | 9/2013 | Thrun | .................. | G01C 21/206 701/418 |

\* cited by examiner

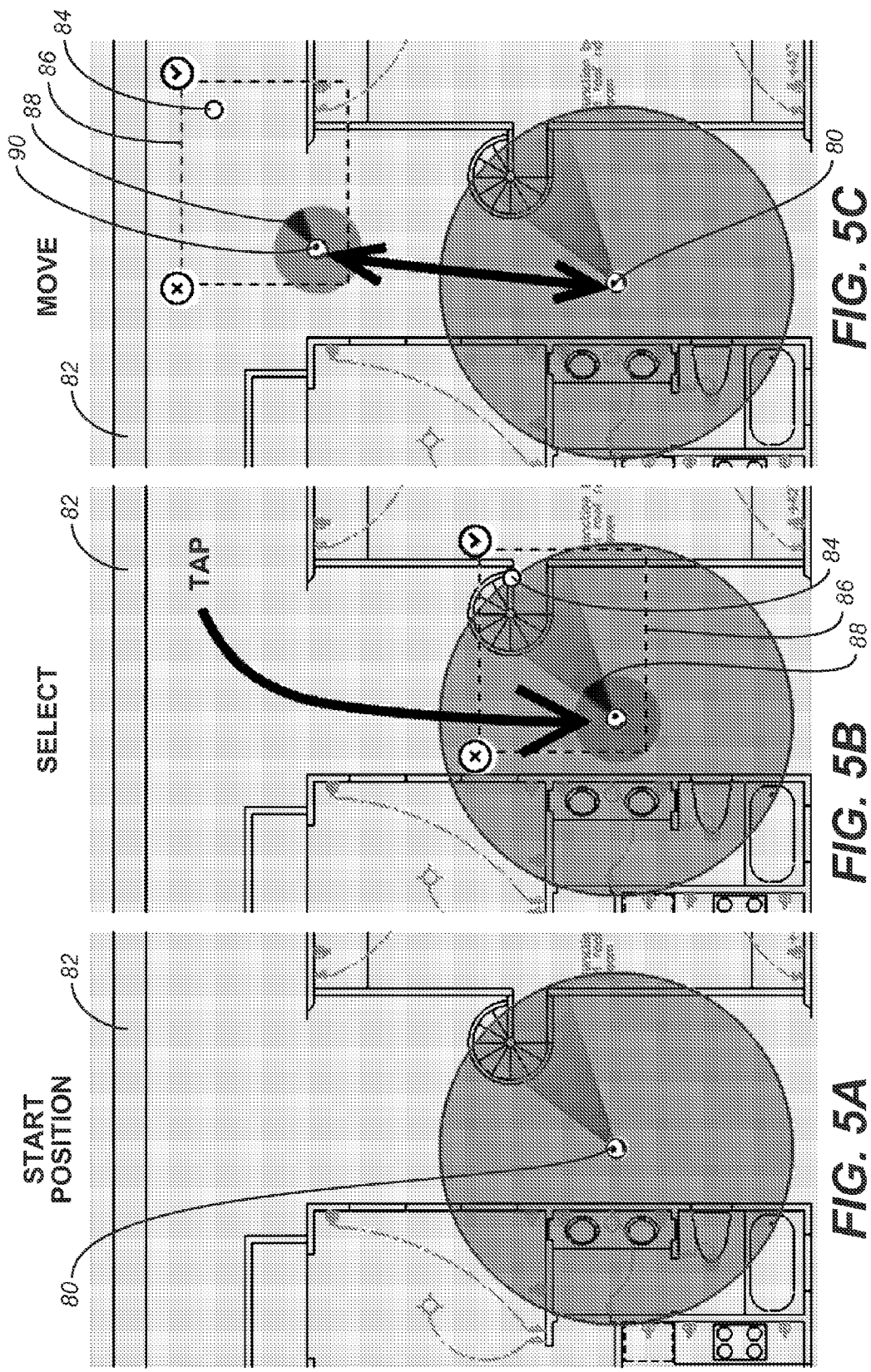

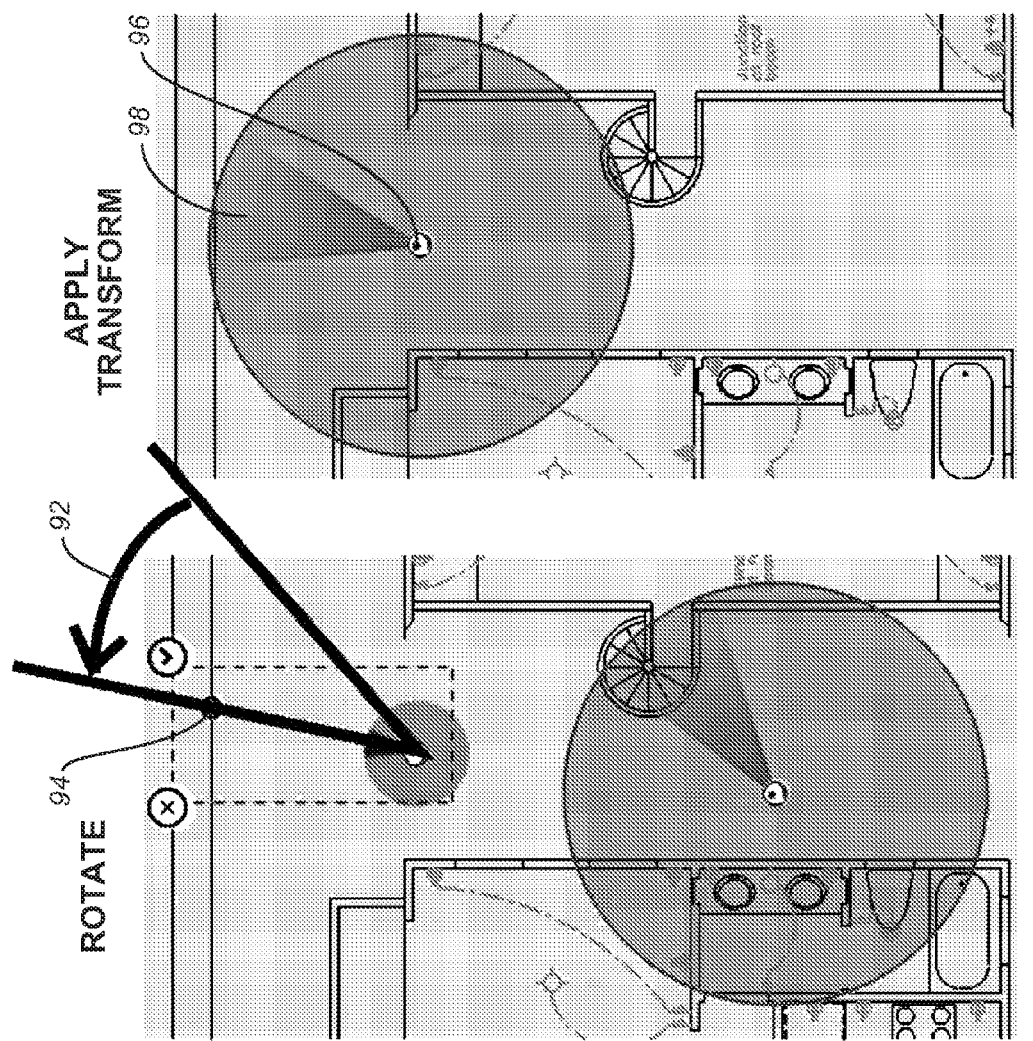

METHOD FOR CALIBRATING THE PHYSICAL POSITION AND ORIENTATION OF AN ELECTRONIC DEVICE

BACKGROUND OF THE INVENTION

Technical Field

The present invention relates to a way to calibrate and display the physical position in a 2D or 3D spatial representation of an electronic device with or without assistance from other forms of electronic positioning systems.

Background Discussion

In an electronic device, it is helpful to display a physical position calibrated in 2D or 3D when data from electronic positioning systems is not available. When data is available from an electronic positioning system (including, but not limited to, GPS, or Global Positioning System, A-GPS, or Assisted Global Positioning System, and WPS, or Wi-Fi Positioning System) it is helpful to more accurately display a physical position calibrated in a 2D or 3D spatial representation.

To provide a concrete example, when performing a building inspection, it is helpful to accurately indicate on an electronic drawing the inspector's current location and orientation, or at least to more accurately indicate the current location. Data from an electronic device's sensors, including but not limited to accelerometers, gyroscopes, compass, and/or motion sensors, and/or the ability to manually fine-tune a position and/or orientation, combined with an electronic display, now make it possible to perform such positional calibration with or without assistance from other forms of electronic positioning systems.

DISCLOSURE OF INVENTION

The present invention is a software-mediated, computer-implemented method for indicating an electronic device's current physical position and/or orientation on the display of an electronic device with or without assistance from other forms of electronic positioning systems. The invention includes an application (program) operated on an electronic device. The application includes methods to display a representation of the physical space, to select reference location(s) in the physical space, to match the selected references to corresponding locations on the representative display, to gather positional data from the device sensors as the device is moved to each reference location, to use this data to determine the position and/or orientation of the device in the 2D or 3D spatial representation on the device display, to drag the position indicator to correct and fine-tune the location and/or orientation, and to mathematically calculate and store offsets. The application may or may not be used to geolocate a non-geolocated document, or it may be included as part of a larger program or suite of programs containing features additional to those described herein.

BRIEF DESCRIPTION OF THE DRAWINGS

The invention will be better understood and its various objects and advantages will become apparent when consideration is given to the following detailed description, which makes reference to the annexed drawings wherein:

FIG. 5A is the first of five schematic views showing screen shots of changes in a device display as a user interacts with the device manually to correct an inaccurately indicated initial location and orientation of the device, this first figure showing a position indicator depicting the user start position on a schematically displayed floor plan;

FIG. 5B is a schematic view showing how the user engages the position indicator in the user interface to correct an observed error in the displayed initial location, and further showing an orientation marker and orientation grid;

FIG. 5C shows how the user moves the position indicator from the inaccurate initially displayed location to the correct location, with corresponding movements of the orientation marker and grid;

FIG. 5D shows how the user engages the user interface to correct the inaccurate initially indicated orientation; and FIG. 5E shows the system display after the system has applied a transform function to recalibrate the device position and orientation and thus displays a corrected position indicator location as well as a corrected orientation.

BEST MODE FOR CARRYING OUT THE INVENTION

Figure 1:
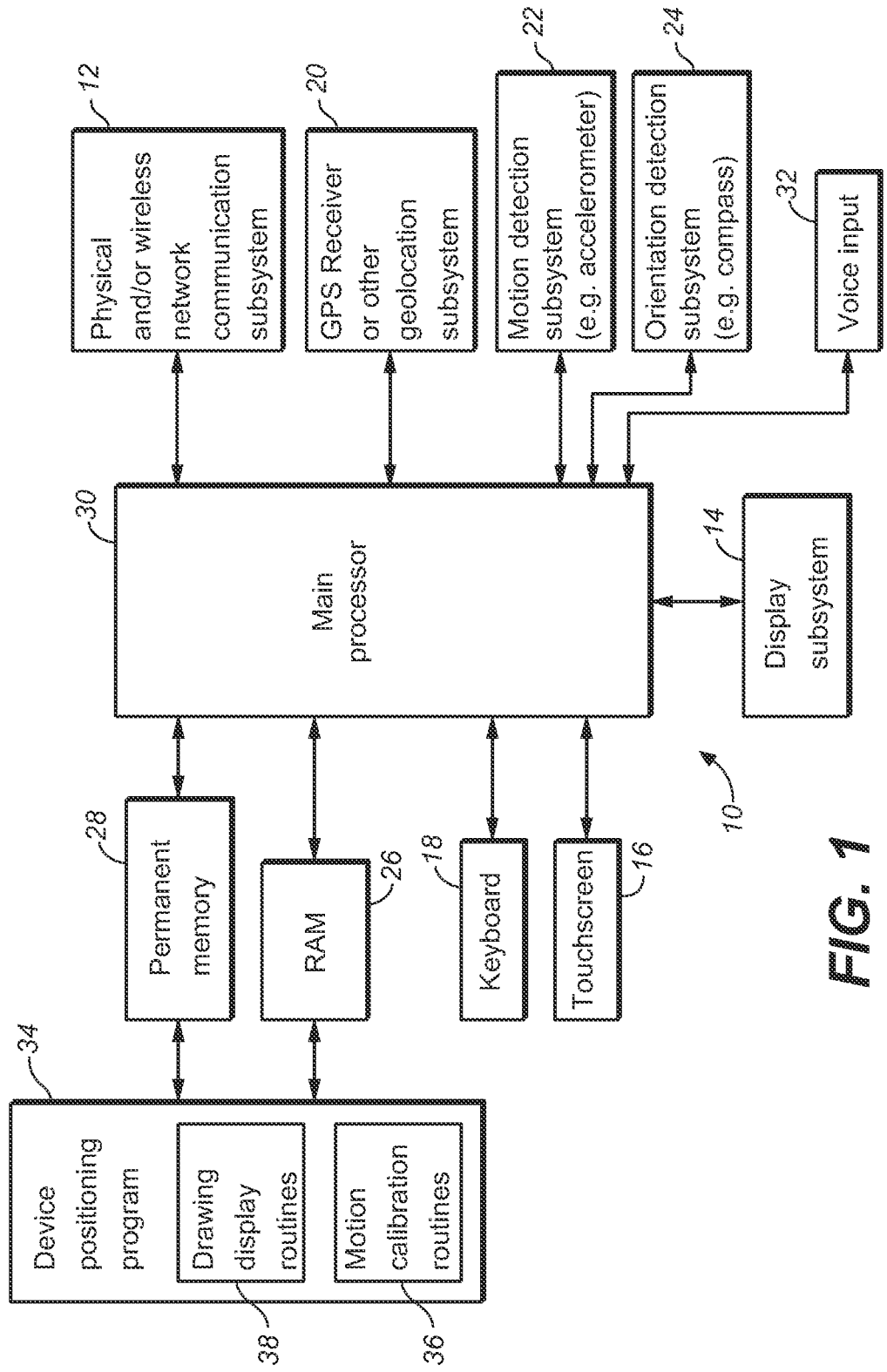
FIG. 1 is a block diagrammatic flow diagram showing the operational elements of an electronic device for operating the system of the present invention.

Referring first to FIG. 1, there is shown a block diagram illustrating an embodiment of an electronic data device 10 suitable for use in and with the present invention. The device may have a variety of features and inputs, but essential components include at least: a main processor 30; means to load a computer-executable program onto the device, possibly by a physical or wireless network communications system 12 or some form of computer-readable removable medium 26, such as a CD-ROM, memory stick, portable hard drive, and the like; computer-readable permanent memory 28 for storing computer-executable programs; a display subsystem 14; a touchscreen 16, keyboard 18, voice input 32, or other means of interacting with the program; motion and orientation sensors and detectors, firstly in an acceleration and motion system 22, including motion detection devices such as, but not limited to, an accelerometer and other motion detection devices or means of determining the device's physical movement, and, secondly, in an orientation detection subsystem 24, such as, but not limited to, a gyroscope, compass, magnetometer, or other orientation detection devices or means of detecting a device's orientation.

The device may also include an optional geolocation subsystem 20 (such as a GPS receiver). The loaded computer-executable program is executed on the device, and the user interface and program output is presented on the display subsystem 14.

In use, the electronic device 10 is removed to a physical space (building, structure, or other specified location) where the program 34 is loaded or initiated, and a spatial representation (e.g., a drawing plan) is selected and displayed by the display subsystem 14, using drawing display routines 38. When the motion calibration routine 36 begins, it may prompt the user to move the device to one or more locations in the physical space and to electronically mark those locations on the displayed spatial representation. If geolocation data from one or more geolocation systems are also available, such geolocation data may be obtained and used as well. Thus, geolocation data, or motion data, or both, are obtained for each point, and such data are collected as the device is moved from one point to the next.

Figure 2:
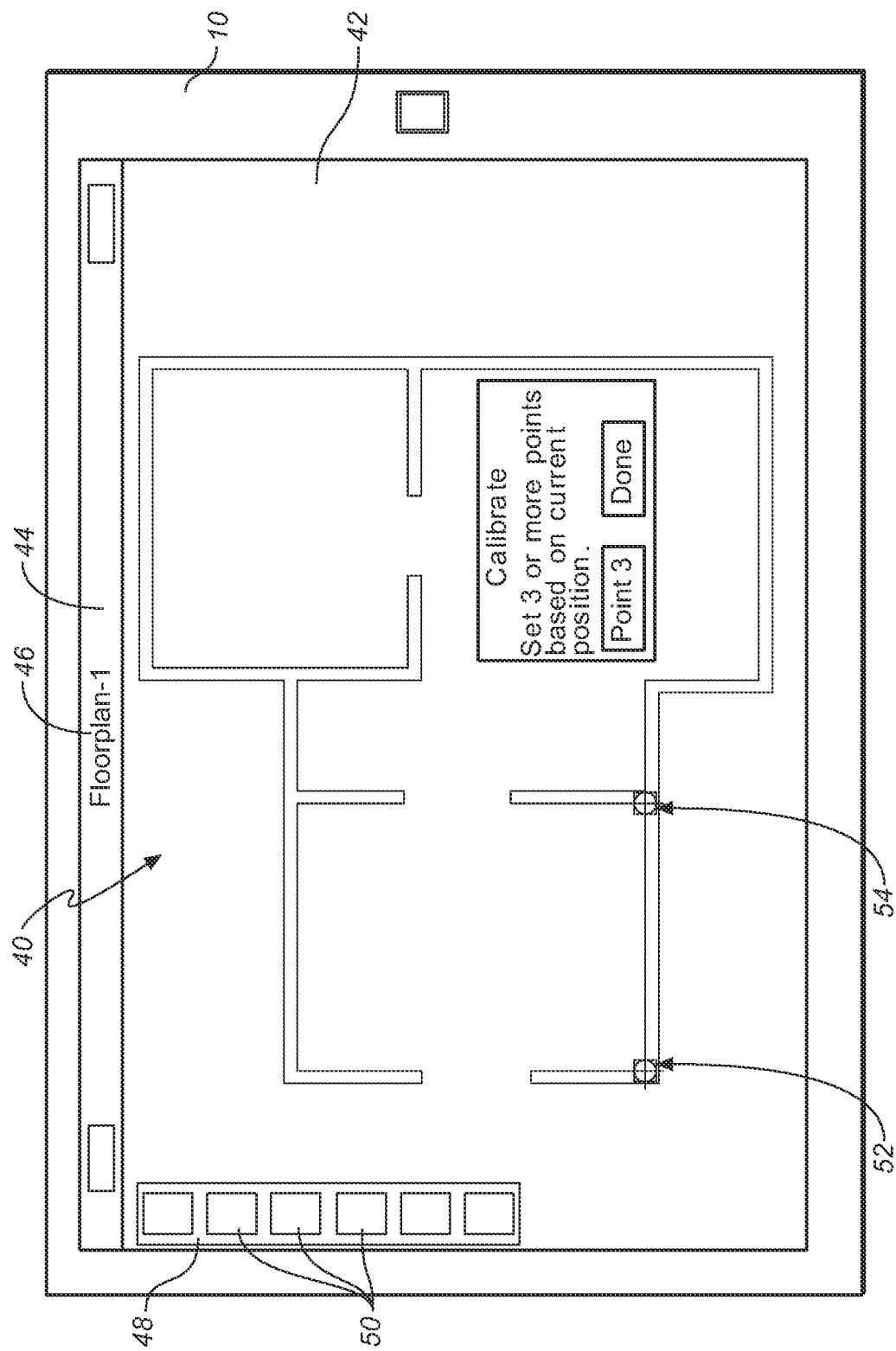
FIG. 2 illustrates is one of many possible schematic displays possible for the type of electronic device in FIG. 1, this illustration showing a representation of a physical space that, in this situation, includes two calibration points.

FIG. 2 shows the electronic device 10, with a sample drawing plan 40 shown on the display surface 42. Optional title bar 44 shows the name 46 of the displayed drawing. A sample representation of a typical user interface bar 48 provides a means of initiating program commands 50. Two calibration points 52 and 54 are shown as already marked, such marking generally accomplished by user inputs through interaction with the user interface. In this situation, after the calibration points have been set, the program calculates a corresponding motion transformation function. As the device moves, this transformation function in conjunction with motion data from the device motion and/or orientation sensors and/or data from an electronic positioning system, or both, are used to calculate the device's updated location in the 2D or 3D spatial representation, either in real time or time-delayed time, thus calibrating the device's physical position and/or orientation to an equivalent location on the displayed representation.

Figure 3:
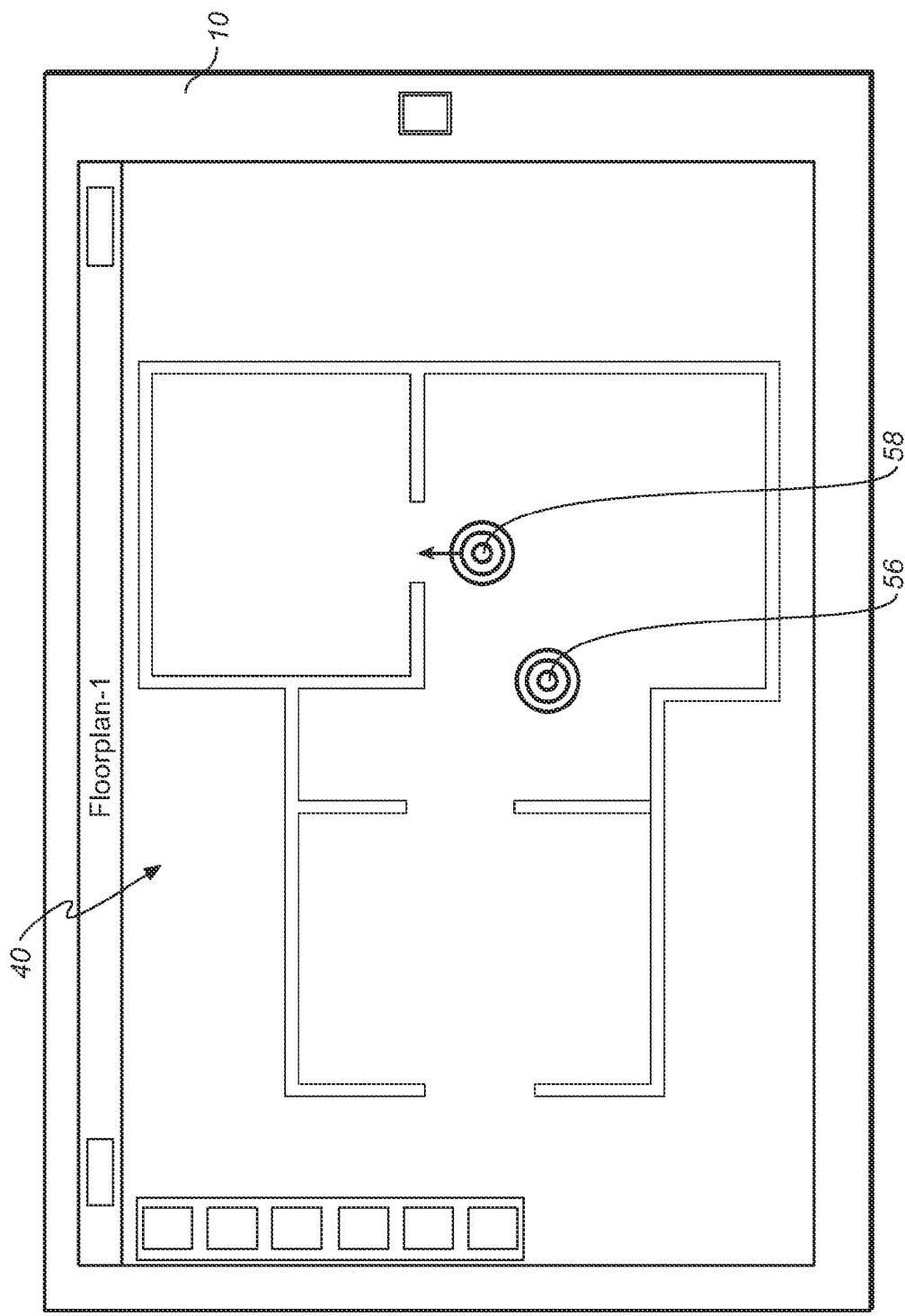
FIG. 3 is schematic view of the same display after calibration is complete, with a sample representation of one of many ways to depict current device position and/or orientation on the display.

FIG. 3 shows the same device 10 and electronic drawing plan 40 after calibration has been completed. The device's current location and orientation are shown on the displayed representation by a sample position indicator 56. When the electronic device is physically moved, the program will change the position and/or orientation of the sample indicator 58 on the displayed representation to show the device's new location and bearing, or direction of movement.

Figure 4:
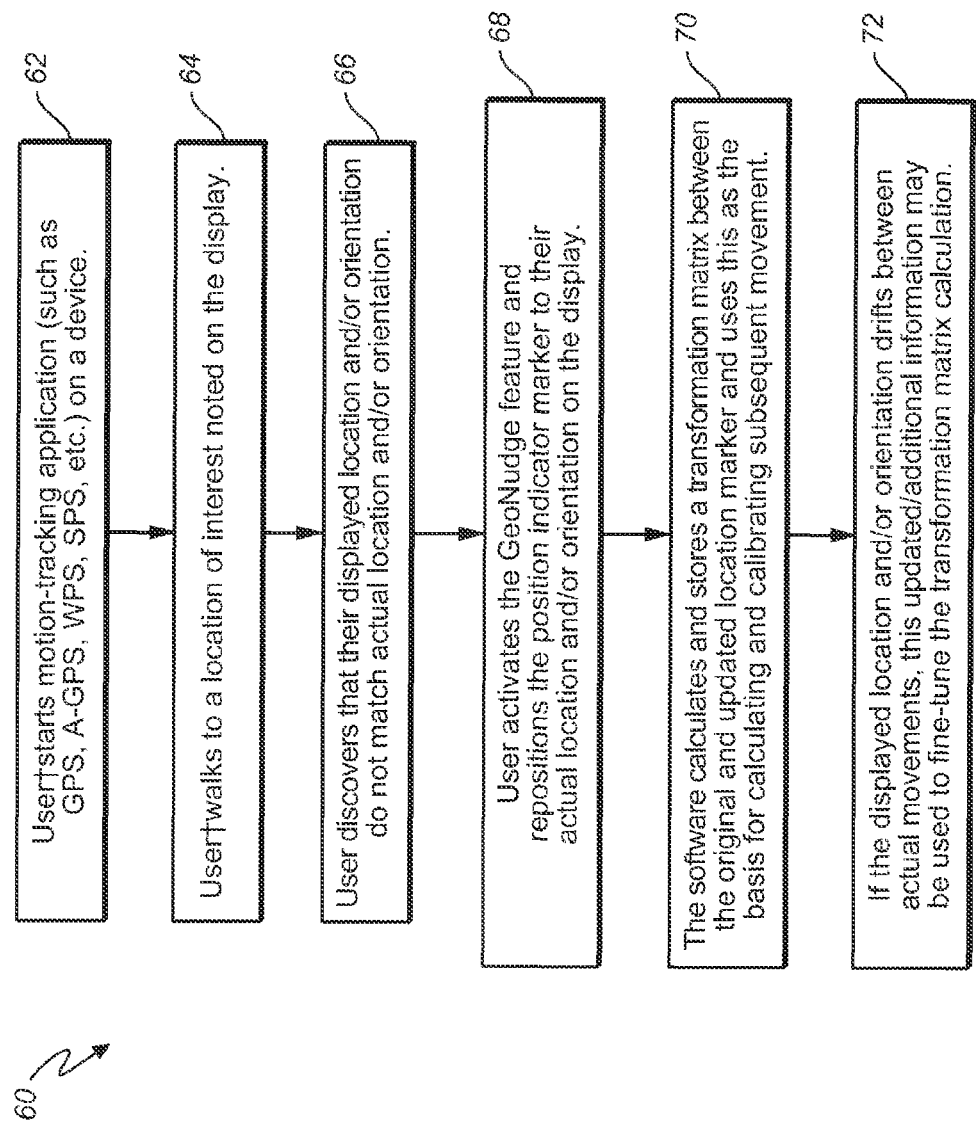
FIG. 4 is a block diagrammatic flow diagram showing the method steps employed by the system of the present invention when a user manually corrects and fine-tunes a location indication in the device display.

The displayed position and/or orientation can also optionally be manually corrected and fine-tuned by simply using the device interface to drag a displayed position indicator to the desired location and/or orientation on the displayed representation. Note that the fine-tuned position and/or orientation will result in an additional positional and/or rotational offset that is also calculated and stored and may or may not be used in future position determinations. Thus, and referring now to FIG. 4, there is shown a flow chart 60 showing the method steps employed by the system of the present invention when manual corrections to the device location are made.

After commencing use of the program, a user starts an optional motion-tracking application 62 (such as GPS, A-GPS, WPS, SPS, etc.) on the electronic device. The user next moves 64 to a location of interest noted on the display. At that point the user may discover 66 that the displayed location and/or orientation do not match actual location and/or orientation. If that is the case, the user then activates 68 the position/orientation recalibration feature and repositions the position indicator marker to the observed actual location and/or orientation on the display. The system software then calculates and stores 70 a transformation matrix between the original and updated location marker and uses this as the basis for calculating and calibrating subsequent movement. If the displayed location and/or orientation drifts or changes between actual movements, this updated/additional information may be used to adjust and fine-tune 72 the transformation matrix calculation.

FIGS. 5A through 5E are schematic views showing screen shots of a sample electronic device display as position and orientation corrections are applied by a user and calculated by the inventive system. In FIG. 5A, there is shown the position indicator 80 depicting the user start position on a schematically displayed floor plan 82. When the user observes an error in the displayed location, he or she taps the position indicator 80, FIG. 5B. An orientation marker 84 and orientation grid 86 are optionally displayed, with an orientation sector 88 describing an arc within which the device is generally pointed. Next, the user moves the position indicator from the inaccurate location to the correct location 90, FIG. 5C, wherein the orientation grid 86 and sector 88 are correspondingly moved. If the orientation indicated is also inaccurate, the user taps the orientation marker 84, FIG. 5D, to correct the indicated orientation indication, which action also moves the orientation marker 84 and sweeps it through an arc 92 to establish a corrected orientation bearing 94 or direction of observation. The system then applies a transform to recalibrate the position and orientation to display a corrected position indicator 96 as well as a corrected orientation sector 98 in which the corrected orientation bearing is generally centered, as shown in FIG. 5E.

In its most essential aspect, system algorithms operate as follows: an initial position point is defined in the electronic device drawing coordinate system corresponding to the estimated physical coordinates calculated by data from whatever on-board motion/position tracking system is employed. An initial device target direction or orientation is also established in the device drawing coordinate system as calculated by the tracking system.

The user may adjust the placement of the position indicator on the device display to correct an inaccurate representation of his physical location. When he does so, the device calculates the offset in drawing coordinates between the original and corrected position points, and executes one or more transformations (e.g. a linear transformation) to determine the corresponding physical coordinates as well as the offset between the originally estimated and corrected physical coordinates.

The user may additionally or separately adjust the orientation of the position indicator on the device display to correct an inaccurate representation of his current orientation. When he does so, the device calculates the offset in drawing coordinates between the original and corrected orientation, and executes one or more transformations (e.g. a linear transformation) to determine the corresponding physical orientation as well as the difference between the originally estimated and corrected physical orientation.

The newly-adjusted physical coordinates and orientation are used as the reference points for further motion tracking. The differences between the estimated and corrected position and orientation may or may not be stored for later use in refining the motion tracking algorithm.

A possible (exemplary) mathematical approach for the recalibration algorithm employed when a user observes an error in the location displayed, selects the displayed position indicator, moves it to the correct location on the display, and (optionally) changes the direction (orientation), is set out as follows:

$$X_{currentInDrawing} = \begin{pmatrix} x \\ y \\ z \\ 1 \end{pmatrix}$$ -the point that defines the position indicator position in the drawing's coordinate system.

-continued $$X_{targetInDrawing} = \begin{pmatrix} x \\ y \\ z \\ 1 \end{pmatrix}$$ -the point that defines the position indicator's direction (target) in the drawing's coordinate system.

$$X_{currentInWorld} = \begin{pmatrix} x \\ y \\ z \\ 1 \end{pmatrix}$$ -point that defines the position indicator position in the world coordinate system.

$$X_{targetInWorld} = \begin{pmatrix} x \\ y \\ z \\ 1 \end{pmatrix}$$ -point that defines the position indicator's direction (target) in the world coordinate system.

$$M_{current} = \begin{pmatrix} a_{11} & a_{12} & a_{13} & a_{14} \\ a_{21} & a_{22} & a_{23} & a_{24} \\ a_{31} & a_{32} & a_{33} & a_{34} \\ a_{41} & a_{42} & a_{43} & a_{44} \end{pmatrix}$$ - current transformation matrix.

$$X_{currentInDrawing} = M_{current} * X_{currentInWorld}$$

$$X_{newInDrawing} = \begin{pmatrix} x \\ y \\ z \\ 1 \end{pmatrix}$$ -new position indicator position in drawing coordinate system.

$$X_{newInWorld} = \begin{pmatrix} x \\ y \\ z \\ 1 \end{pmatrix}$$ -new position indicator position in world coordinate system.

$$M_{new} = \begin{pmatrix} a_{11} & a_{12} & a_{13} & a_{14} \\ a_{21} & a_{22} & a_{23} & a_{24} \\ a_{31} & a_{32} & a_{33} & a_{34} \\ a_{41} & a_{42} & a_{43} & a_{44} \end{pmatrix}$$ -new transformation matrix.

$$X_{newInDrawing} = M_{new} * X_{newInWorld}$$

The mathematics employed to calculate the rotation and offset matrix for the position indicator are set out as follows:

$$D_{offset} = \begin{pmatrix} Dx \\ Dy \\ Dz \\ 1 \end{pmatrix}$$

$$M_{offset} = \begin{pmatrix} 1 & 0 & 0 & 0 \\ 0 & 1 & 0 & 0 \\ 0 & 0 & 1 & 0 \\ Dx & Dy & Dz & 1 \end{pmatrix}$$

$$M_{rotation} = \begin{pmatrix} \cos(a) & \sin(a) & 0 & 0 \\ -\sin(a) & \cos(a) & 0 & 0 \\ 0 & 0 & 1 & 0 \\ 0 & 0 & 0 & 1 \end{pmatrix}$$

Finally, the mathematics employed to calculate the rotation angle and offset for the position indicator are as follows:

$$D_{offset} = X_{new} - X_{old}$$

$$a_{current} = 0x \char`\^(X_{current} - X_{currentTarget})$$

$$a_{new} = 0x \char`\^(X_{new} - X_{newTarget})$$

$$a = a_{new} - a_{current}$$

In the result there are express $M_{new}$ by $M_{current}$.

$$M_{new} = M_{current} * M_{rotation} * M_{offset}$$

The foregoing disclosure is sufficient to enable those with skill in the relevant art to practice the invention without undue experimentation. The disclosure further provides the best mode of practicing the invention now contemplated by the inventor.

What is claimed as invention is:

1. A method of calibrating the physical location and orientation of an electronic device, comprising:
   (a) providing an electronic data device having,
      a core processor,
      permanent memory for storing a program,
      temporary memory for loading and running a computer-executable program,
      a computer-executable position and orientation calibration program loadable onto the electronic data device,
      an electronic visual display,
      a visual display subsystem,
      at least one user input for interacting with a computer-executable program,
      a motion detection subsystem,
      an orientation detection subsystem, and
      a geolocation subsystem;
   (b) moving the electronic data device in a physical space;
   (c) loading the position and orientation calibration program with a device drawing coordinate system onto the electronic data device, the position and orientation program having instructions which, when executed by the electronic data device, causes the electronic data device to visually display a user interface, a two- or three-dimensional virtual representation of a physical space on the electronic visual display, wherein when data from the geolocation subsystem is available, an initial position indicator signifying an estimated initial location and orientation of the electronic data device in the physical space, and wherein when geolocation data is not available, said program prompts the user to move to one or more locations in the physical space to electronically set and define at least one calibration point;
   (d) initiating execution of the position and orientation calibration program;
   (e) defining an initial location point in the electronic device drawing coordinate system corresponding to the estimated initial location and orientation obtained from the geolocation subsystem data or from user-provided calibration points;

(f) displaying on the electronic visual display a visual position indicator indicating an initial location and orientation; and (g) at the user's option, and according to whether an initial location is obtained from user-provided calibration points or from geolocation subsystem data, respectively, either, (1) manually adjusting the placement of the visual position indicator on the device display to correct any observed inaccurate representation of the electronic data device physical location or (2) proceeding directly to move about in the physical space;

wherein when step (g)(1) is executed, the position and orientation calibration program calculates an offset in drawing coordinates between the initial and corrected position points, and executes one or more transformations to determine the corresponding physical coordinates as well as the offset between the initially estimated location and orientation and the physical coordinates of the corrected location; and wherein when step (g)(2) is executed, after the calibration points have been marked, the position and orientation calibration program initiates a motion transformation function to display on the electronic visual display a visual position indicator indicating the initial location and orientation based on the set calibration points and thereafter uses the motion transformation function, in conjunction with motion and orientation data from the device motion and orientation subsystems, to calibrate the actual physical location and orientation of the electronic data device in the physical space and to calculate and display an updated location of the electronic data device in the 2D or 3D spatial representation.

2. The method of claim 1, wherein step (g)(1) is executed, and further including adjusting the orientation of the visual position indicator on the electronic data device electronic visual display to correct a user-observed inaccurate representation of the displayed orientation.

3. The method of claim 2, wherein step (g)(1) is executed, and further including using the position and orientation calibration program to calculate the offset in drawing coordinates between the initial location and corrected orientation, and executing one or more transformations to determine the corresponding physical orientation as well as the difference between the initially estimated and corrected physical orientation.

4. The method of claim 3, further including using the adjusted physical orientation as a reference point for further motion and orientation tracking.

5. The method of claim 3, further including storing differences between the initially estimated location and the corrected location for later use in refining the motion tracking algorithm.

6. The method of claim 1, wherein step (g)(1) is executed, and further including using the position and calibration program to calculate the offset in drawing coordinates between the initially estimated and the corrected location, and executing one or more transformations to determine the corresponding physical location as well as the difference between the initially estimated and corrected physical location.

7. The method of claim 6, further including using the adjusted physical orientation as a reference point for further motion and orientation tracking.

8. The method of claim 6, further including storing differences between the initially estimated location and the corrected location for later use in refining the motion tracking algorithm.

9. The method of claim 1, wherein the electronic data device includes at least one geolocation subsystem and the initially estimated location is calculated by data from the at least one geolocation subsystem.

10. The method of claim 1, wherein the user input device includes at least one of a touchscreen, a keyboard, and a voice input.

11. The method of claim 1, wherein the geolocation subsystem includes at least one or more of a GPS, A-GPS, and WPS system, alone or in any combination.

12. The method of claim 1, wherein the motion and orientation detection subsystems includes at least one of a pedometer, an accelerometer, a compass, a gyroscope, and a magnetometer, alone or in any combination.

13. The method of claim 1, wherein data from the motion and orientation subsystems is used to calculate the estimated initial location.

14. The method of claim 1, wherein the step (g)(2) is executed, wherein when the electronic device is physically moved, the position and orientation program will cause the electronic data device to change the position and orientation of the position indicator on the displayed representation so as to show the new location and heading direction of the electronic data device within the physical space.

* * * * *